Aug. 22, 1967  J. M. VALDESPINO  3,336,757
LIQUID LEVEL CONTROL MECHANISM
Filed Oct. 25, 1963

INVENTOR
JOE M. VALDESPINO

BY
ATTORNEY

United States Patent Office

3,336,757
Patented Aug. 22, 1967

3,336,757
LIQUID LEVEL CONTROL MECHANISM
Joe M. Valdespino, Orlando, Fla., assignor to Pacific Flush Tank Company, Chicago, Ill.
Filed Oct. 25, 1963, Ser. No. 319,042
5 Claims. (Cl. 61—28)

This invention relates to the containment, release, and distribution of water, and other liquids, to the regulation and control of the flow thereof, and to mechanism by which liquids may be released from a larger body of liquid in a specifically controlled manner.

The invention relates particularly to the manner and control of the release of liquid from a body of such liquid, and to structure by which such control and release of the liquid may be taken, whether from below the surface, or from the surface of the contained liquid from which the release is made.

Usually release of liquid from a body has been by overflow from such retained body of liquid with the result that only the surface liquid was released. On occasions it it desirable that liquid from beneath the surface of a body of liquid be discharged in order to take with it matter of greater density and greater specific gravity.

It is an object of the invention to provide simple, inexpensive, and automatically operated liquid level control mechanism of a character which can be operated to permit the discharge of liquid from below the liquid level or to allow the discharge at the liquid level and with the discharge automatically controlled in accordance with the level of the liquid from which the discharge is made.

Another object of the invention is to provide liquid discharge mechanism for releasing liquid from a body of liquid below the liquid level or for releasing liquid at the liquid level, and which release of liquid can be regulated or adjusted automatically to control such discharge including a gate attached to be operated by a pivotally mounted rocker arm connected to be rocked by a buoyant member to move said gate and release liquid.

Another object of the invention is to provide float actuated rocker arm gate operating liquid level control mechanism having counterbalancing means for compensating for the weight of said gate and with such float disposable on opposite sides of the pivot of the rocker arm for effecting release of liquid from below the surface level or at the surface level depending upon the side of the pivot the buoyant member is located.

Figure 1:
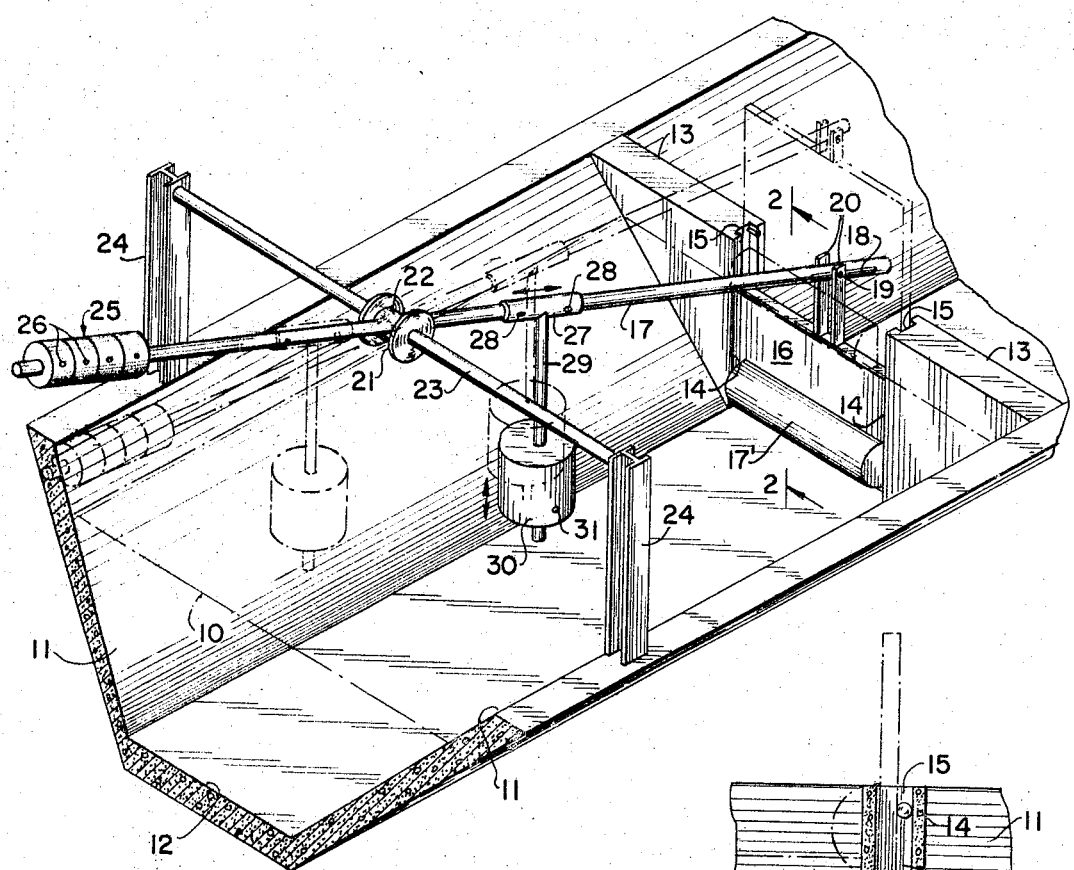
Figure 3:
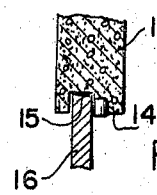
Figure 2:
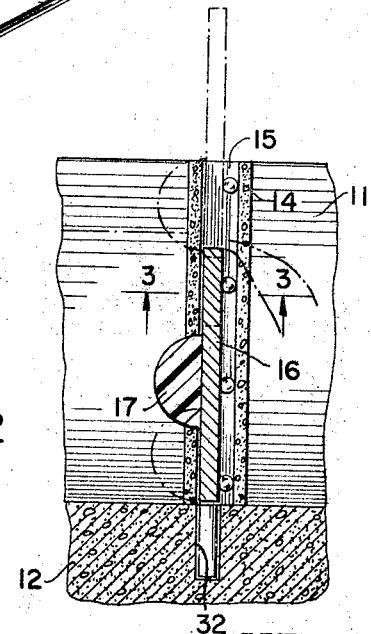

Other objects and advantages of the invention will be apparent from the following description taken in conjunction with the accompanying drawing in which:

FIG. 1 is a perspective illustrating one application of the invention;

FIG. 2, an enlarged vertical section on the line 2—2 of FIG. 1; and,

FIG. 3, a horizontal section on the line 3—3 of FIG. 2.

Briefly stated the invention is an automatic liquid level control for use with tanks of a sewage treatment system or other uses by which a control element is moved to release liquid in accordance with the movement of a rocker arm and spaced connections, one of which is fixed and the other supported by a float or buoyant member, thus operating in accordance with the liquid level to release liquid when the level rises and to discontinue the release or reduce the release as the level decreases.

With continued reference to the drawings, water or other liquid having a level indicated by the dot and dash line 10, is retained in a tank or body by side and bottom walls 11 and 12. These side and bottom walls may be of natural or man-made construction, as may be also a retaining wall or dam 13, having an opening 14 with a slideway 15 at each side of the same between which slideway is received a gate 16. By raising and lowering the gate liquid is released to permit such liquid to pass thereover, such gate being provided with a buoyant member beneath the normal water level to compensate at least in part for the weight of the gate.

In order to allow water to flow from the body thereof, either beneath the gate or over the gate, mechanism is provided including a rocker arm 17 having a slot 18 in one end portion in which is received a pin 19 carried by a pair of lugs 20 attached to the top of the gate 16 so that by movement of the rocker arm 17 and the pivot 19 the gate will be moved accordingly.

The rocker arm 17 has a fulcrum or pivot bearing-forming sleeve 21 in which a non-friction bearing 22 is located and which in turn receives a fulcrum or pivot forming crossbar 23 carried by spaced posts 24. The rocker arm extends on the opposite sides of the crossbar 23 and is adapted slidably to receive counterweights 25 which are adapted to be secured in adjusted position by set screws 26.

In order to provide a submerged discharge of liquid there is located between the crossbar 23 and the gate 16 on the rocker arm 17, a sleeve 27 held in position in any desired manner as by set screws 28, such sleeve having a depending support or post 29 on which is slidably mounted a float or buoyant member 30, secured to the post 29 in adjusted position by means, for example, of a set screw 31.

With the construction just described the buoyant member 30 will undertake to raise the gate 16 and allow outflow therebeneath the buoyant member 17 and the counterweight 26 serving to counterbalance the weight of the gate 16. When the water level rises the float or buoyant member 30 likewise will rise causing the gate to rise and permit discharge beneath the same, and in like manner when the water level lowers the buoyant member 30 will lower causing the gate to lower and reduce or stop the discharge therebeneath.

When it is desired to maintain substantially a constant water level within the tank or body and to cause discharge only at the surface thereof, the sleeve 27 with the buoyant member 30 and associated parts are placed on the rocker arm on the opposite side of the crossbar or fulcrum 23 in the position illustrated in dotted lines in FIG. 1. A gate receiving slot 32 (FIG. 2) is provided below the gate 16 and a removable stop may be provided at the top of such gate. In this modification the counterweights 25 and the buoyant member 17′ are sufficient to overcome the weight of the gate 16 and cause such gate to be raised into contact with the stop 33. The buoyant member 30 is adjusted to permit a predetermined rate of flow to pass over the top of the gate 16. This will determine the substantially constant water line. If an excessive amount of liquid is introduced into the body, the liquid level will apply an upward force on the member 30 which in turn will apply a downward force on the gate 16 to overcome the buoyancy thereof and move the gate downwardly into the slot 32 so that a greater amount of liquid can be discharged from the body without substantially changing the liquid level thereof.

In the operation of the device, before water is introduced into the body, the counterweights 25 are adjusted on the rocker arm 17 to partially counterbalance the weight of the gate 16. When liquid is introduced into the body, the buoyant member 17′ will relieve additional weight of the gate so that most of the weight of the gate is supported by the buoyant member 17′ and the counterweights 25. The liquid level 10 will continue to rise until it is higher than the gate 16 and a predetermined rate of flow is discharged from the body over the top of the gate which forms a weir. When the predetermined rate of flow over the gate has been reached, the buoyant member 30 will relieve the remaining weight of the gate 16 so that any additional increase in the rate of flow into the body will cause the buoyant member 30 to raise the gate 16 and permit the increased flow to be discharged beneath the gate so that liquid will be discharged over and under the gate simultaneously.

The predetermined rate of flow of liquid over the top of the gate is controlled by the position of the buoyant member 30 on the post 29 and the position of the sleeve 27 on the rocker arm 17 as long as the rocker arm 17 is disposed at an angle to the liquid level 10 when the gate is closed. If the rocker arm is substantially parallel with the liquid level when the gate is closed, the predetermined rate of flow over the top of the gate will be controlled by the position of the buoyant member 30 on the post 29.

Normally the predetermined rate of flow over the top of the gate is substantially equal to the rate of flow of the liquid into the body. The liquid flowing into the body may come from any source such as a sewage treatment plant and may contain a small amount of solids suspended therein. While the liquid is in the body, the solids tend to settle to the bottom 12 and if left alone would gradually build up a large deposit. When the flow of liquid into the body is increased and the gate opens at the bottom, the sediment will be discharged from the bottom of the body.

It will be apparent from the foregoing that liquid level control mechanism is provided of simple and inexpensive construction which can be readily installed and operated to discharge liquid either from beneath the surface or at the surface and that such control mechanism is automatically operative in accordance with the level of the liquid wherever desired including in a sewage treatment system for controlling discharge from one or more units including those where there is substantial sedimentation.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. Automatic liquid level control mechanism comprising wall structure defining a tank having a liquid inlet and an outlet opening, an imperforate vertically movable closure gate having a top edge and a bottom edge, said gate being disposed transversely of said outlet opening and normally with the bottom edge thereof in engagement with the bottom of the tank and closing the lower portion of said opening while permitting liquid to be discharged over the top edge, an elongated rocker arm having one end freely movably connected to said gate, a fulcrum rockably supporting said rocker arm intermediate the ends thereof, at least one weight adjustably mounted on the opposite end of said rocker arm to provide for partial counterbalancing of said gate, a first buoyant member fixed to said gate below the liquid level of said tank and providing additional counterbalancing, a sleeve adjustably mounted on said rocker arm between said gate and said fulcrum for sliding movement therealong, a post attached to said sleeve, a second buoyant member adjustably mounted on said post to raise said gate and space the bottom edge thereof from the bottom of said tank in direct response to an increase in the liquid level of said tank, whereby when the volume of liquid within the tank is increased, said second buoyant member will raise said gate to discharge additional liquid beneath said bottom edge.

2. Automatic liquid level control mechanism for a body of liquid having a liquid inlet comprising a dam having a discharge opening, an imperforate generally vertically movable closure gate having a top edge and a bottom edge mounted in said dam, said gate being disposed transversely of said discharge opening and normally closing the lower portion thereof while permitting the liquid from the body of water to be discharged over the top edge of said closure gate, rocker arm means freely movably connected adjacent one end to said gate, a fulcrum rockably supporting said rocker arm means intermediate the ends thereof, counterbalancing means on the opposite end of said rocker arm means, and a buoyant member adjustably mounted on said rocker arm means between said gate and said counterbalancing means to move said gate to up and down positions relative to the normal closing position in direct response to an increase in the volume of liquid within the body, whereby, when the volume of liquid within the body is increased, said buoyant member will move said gate generally vertically to discharge additional liquid past one of said edges.

3. The structure of claim 2 in which said buoyant member is mounted on said rocker arm means between said gate and said fulcrum so that said buoyant member will raise said gate to discharge additional liquid beneath said bottom edge.

4. The structure of claim 2 including a recess in said dam below said discharge opening, and said buoyant member being adjustably mounted on said rocker arm means between said fulcrum and said counterbalancing means so that said buoyant member will lower said gate from the normal closing position into said recess to discharge additional liquid over said top edge.

5. The structure of claim 2 including a second buoyant member fixed to said gate below the normal liquid level of said body of liquid.

References Cited

UNITED STATES PATENTS

| 917,381 | 4/1909 | Twiford | 61—23 |
|---|---|---|---|
| 1,093,425 | 4/1914 | Hurst | 61—28 |
| 1,663,411 | 3/1928 | Little et al. | 137—398 X |
| 1,738,051 | 12/1929 | Harker | 61—23 |
| 1,990,501 | 2/1935 | Poirer | 137—398 X |
| 2,150,714 | 3/1939 | Davis et al. | 137—398 X |
| 2,699,653 | 1/1955 | Ponsar | 61—28 |
| 3,208,225 | 9/1965 | Humpherys | 61—28 X |

FOREIGN PATENTS

| 645,345 | 6/1926 | France. |
|---|---|---|
| 216,891 | 1/1942 | Switzerland. |

EARL J. WITMER, *Primary Examiner.*